United States Patent [19]

Samela et al.

[11] Patent Number: 5,510,701
[45] Date of Patent: Apr. 23, 1996

[54] INACTIVE STATE TERMINATION TESTER

[75] Inventors: Francis M. Samela, Lombard; Joseph R. Llorens, Winfield, both of Ill.

[73] Assignee: Methode Electronics, Inc., Chicago, Ill.

[21] Appl. No.: 333,777

[22] Filed: Nov. 3, 1994

Related U.S. Application Data

[63] Continuation-in-part of Ser. No. 285,970, Aug. 4, 1994.

[51] Int. Cl.[6] .................................................. G01R 27/00
[52] U.S. Cl. ..................... 324/71.1; 324/691; 370/85.1; 367/13; 340/635; 307/112
[58] Field of Search ................................. 324/512, 523, 324/525, 691, 705, 713, 71.1; 370/85.1; 367/13; 340/514, 635; 307/112

[56] References Cited

U.S. PATENT DOCUMENTS

| | | | |
|---|---|---|---|
| 4,386,242 | 5/1983 | Seidel | 370/26 |
| 5,272,396 | 12/1993 | Mammano et al. | 307/443 |
| 5,313,105 | 5/1994 | Samela et al. | 307/99 |

OTHER PUBLICATIONS

Bill Stanley (Member of the technical staff at adaptec), Automatic Termination Metdod 2, Jun. 8, 1994, pp. 5–7 contained in the Plug and Play SCSI Workshop.
Unitrode Integrated Circuits, 9–Line SCSI Active Terminator, Feb. 1993.

*Primary Examiner*—Kenneth A. Wieder
*Assistant Examiner*—Glenn W. Brown
*Attorney, Agent, or Firm*—Eddie L. Bishop; David L. Newman

[57] ABSTRACT

An inactive state termination tester for determining the number of terminators connected to a bus when the bus is inactive. The termination tester monitors the bus for determining when it is inactive. During the periods of bus inactivity, the termination tester senses the bus to determine the number of terminators connected to the bus. The termination tester then displays how many terminators were detected and/or generates a signal to either enable or disable, respectively, a controllable bus terminator depending on if there are not enough or too many terminators determined to be connected to the bus.

21 Claims, 2 Drawing Sheets

INACTIVE STATE TERMINATION TESTER

This is a continuation-in-part of application Ser. No. 08/285,970, filed Aug. 4, 1994, pending.

BACKGROUND OF THE INVENTION

This invention relates generally to terminator devices and in particular, it relates to a detection method and apparatus used with a bus for detecting the number of terminators connected to the bus transmission lines.

One application where reliable data transfers are important is in the field of data transmissions on a bus transmission line for communication between a plurality of peripherals and a central processing unit in a small computer. For example, a Small Computer System Interface (SCSI) bus provides for such a communication link.

As is generally known in the art of designing bus transmission lines, a terminator, comprising of a resistor network, is typically connected to each of the physical ends of the bus in order to eliminate line reflection created by the transmission of signals on the bus. Both of the terminators have a characteristic impedance equal to that of the bus.

Many peripherals, such as disk drives, are adapted to connect to the bus. These peripherals are usually equipped with a bus terminator which is to be removed if the peripheral is not connected to one end of the bus. However, with the addition and removal of various peripherals from the bus, terminators may inadvertently be omitted or more than one terminator may be inadvertently connected to the bus.

Visual verification of the number of terminators connected to the bus normally requires the system to be turned off and the system components disassembled. However, there are prior art designs which measure the number of terminators connected to the bus, but all of these designs share the same disadvantage of requiring the computer system to be rendered inactive in order for the bus to be tested.

Therefore, there is a need for a diagnostic apparatus which has the ability to determine the number of terminators present on a bus without deactivating the computer system. The present invention is such an apparatus.

In view of the above, it is an object of the invention to determine if the bus is active. If the bus is found to be inactive, the diagnostic phase commences.

It is another object of the present invention to determine the number of terminators connected to the bus.

It is still another object of the present invention to display the number of terminators connected to the bus.

It is a further object of the present invention to provide a signal for enabling or disabling a controllable bus terminator, respectively, depending on if there are not enough or too many terminators determined to be connected to the bus.

Another object of the present invention is to provide a controllable bus terminator which is enabled or disabled, respectively, depending on if there are not enough or too many terminators determined to be connected to the bus.

SUMMARY OF THE INVENTION

In one form of the invention, an inactive state termination tester determines the number of terminators connected to a bus when the bus is established to be in an inactive state. The termination tester operates by monitoring the bus to determine when it is inactive. When the bus is determined to be inactive, the termination tester senses the bus to determine how many terminators are connected to the bus. The termination tester then displays how many terminators were detected and/or generates a signal to either enable or disable, respectively, a controllable bus terminator depending on if there are not enough or too many terminators determined to be connected to the bus.

Various means for practicing the invention and other advantages and novel features thereof will be apparent from the following detailed description of an illustrative preferred embodiment of the invention.

BRIEF DESCRIPTION OF THE DRAWINGS

There is shown in the drawing a presently preferred embodiment of the present invention, wherein like numerals in the various figures pertain to like elements, and wherein.

DETAILED DESCRIPTION OF THE PRESENTLY PREFERRED EMBODIMENTS

Figure 1:
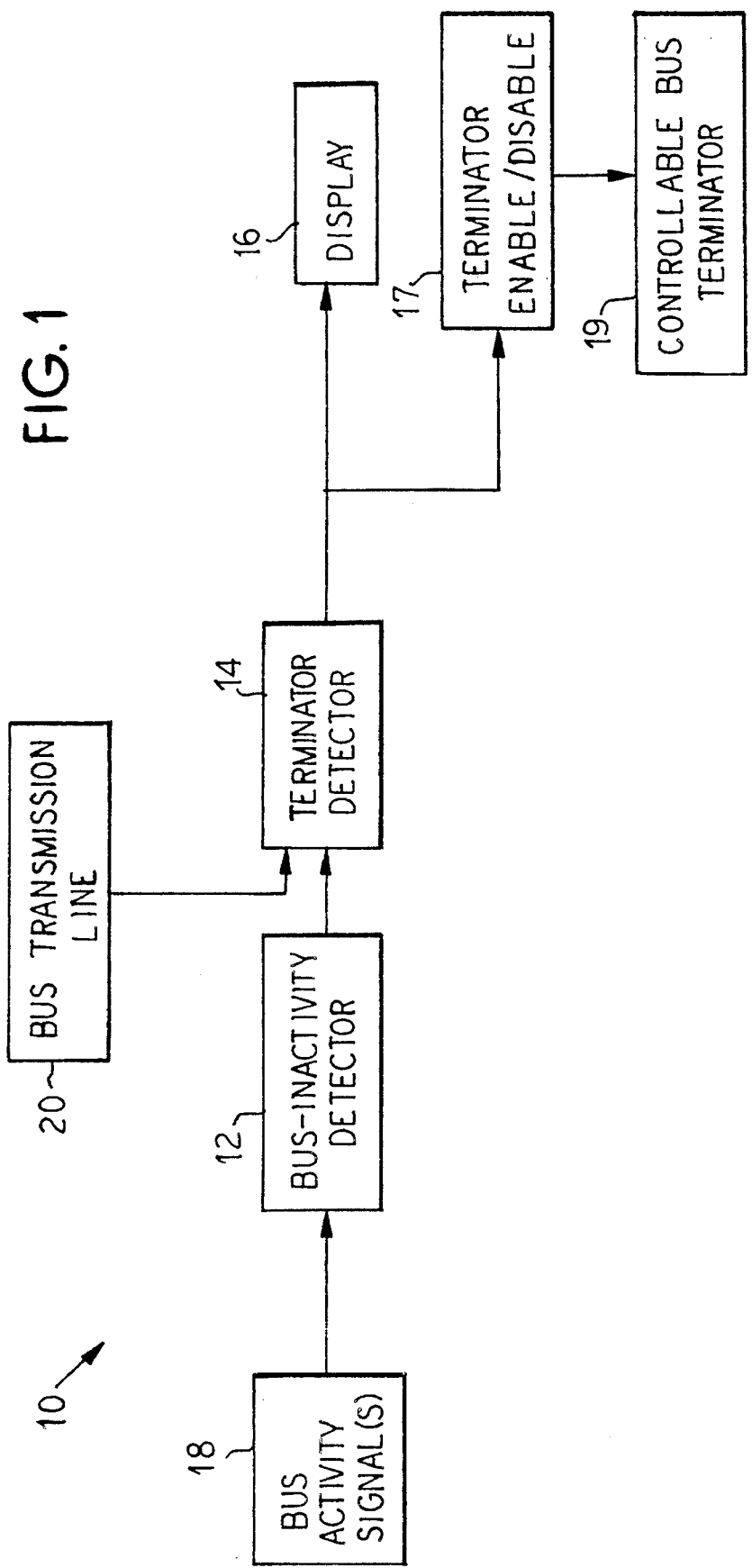
FIG. 1 is a functional block diagram of an inactive state termination tester apparatus.

Referring to the drawing, and particularly to FIG. 1, a functional block diagram of an inactive state termination tester apparatus 10 is depicted with a bus-inactivity detector 12, a terminator detector 14, a display 16, a terminator enable/disable 17, and a controllable bus terminator 19.

The bus-inactivity detector 12 is adapted to be used with or connected to a bus and receive a bus activity signal(s) 18 indicating if the bus is either active or inactive. When the bus is inactive, the bus-inactivity detector 12 transmits a signal to the terminator detector 14 indicating that testing of the bus should commence. The terminator detector 14 then determines the number of terminators connected to the bus transmission line 20 and this result is received and presented by the display 16. Furthermore, depending on if too many or not enough terminators were detected on the bus, the terminator enable/disable 17 will provide for enabling or disabling a controllable bus terminator 19.

Figure 2:
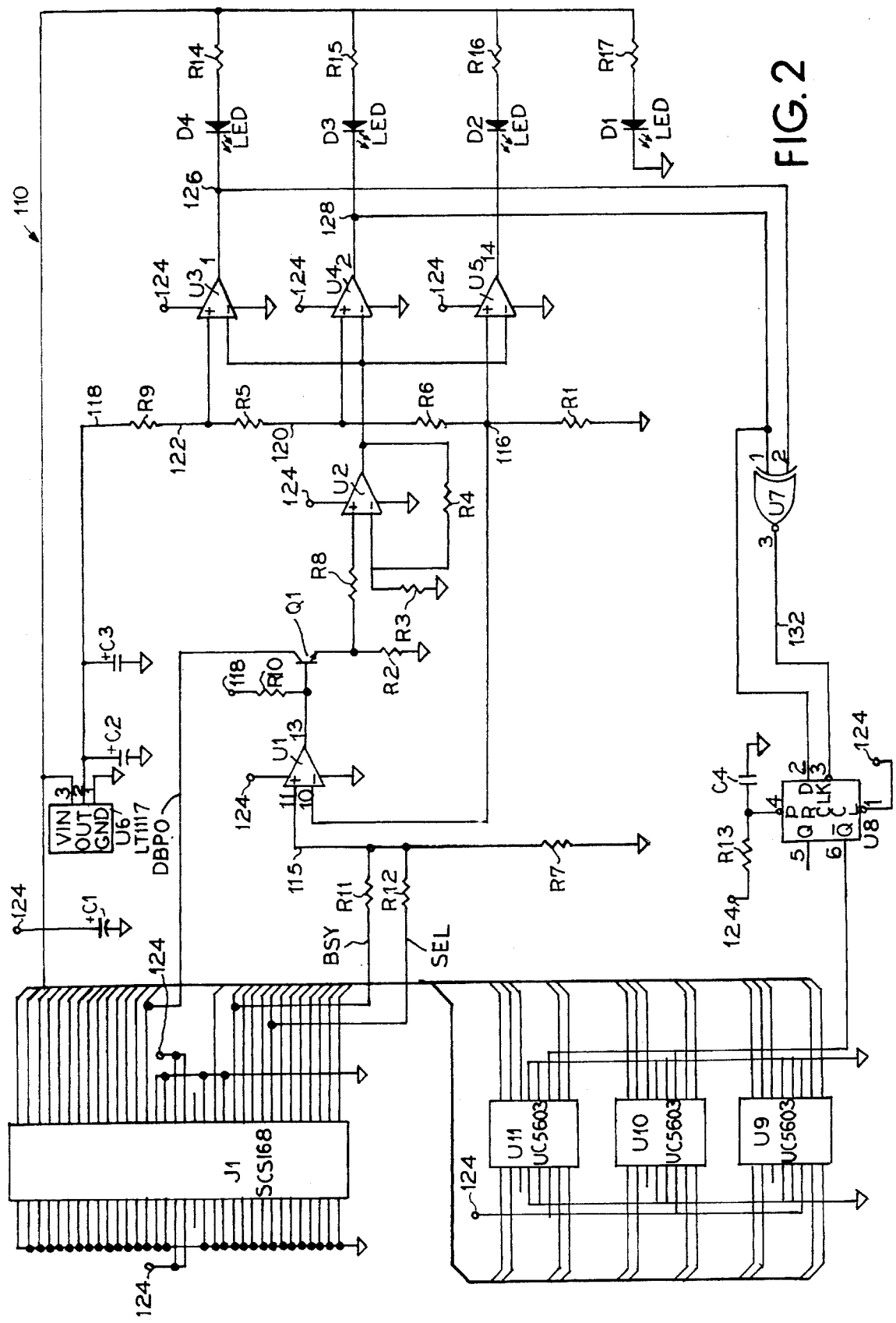
FIG. 2 is a detailed schematic circuit diagram of an inactive state termination tester apparatus constructed in accordance with the principles of the present invention for use with or connected to a SCSI bus.

Turning to FIG. 2, an inactive state termination tester apparatus 110 is depicted which is constructed in accordance with the principles of the present invention for use with a SCSI bus. It is to be understood that the embodiment shown in association with a SCSI bus is not intended to serve as a limitation upon the scope or teaching thereof, but is merely for the purpose of convenience of illustration of one example of the invention's application.

The inactive state termination tester apparatus 110 depicted in FIG. 2 is configured to be connected to the SCSI bus by means of a connector J1. The terminator tester apparatus includes a comparator U1 which is configured as a logic AND gate for the purpose of determining when the SCSI bus is inactive. To accomplish this task, one end of a resistor R11 is connected, via connector J1, to the BUSY signal 112 of the SCSI bus and the other end of the resistor is connected to the non-inverting input of the comparator U1. Likewise, one end of a resistor R12 is connected, via connector J1, to the SELECT signal 114 of the SCSI bus with the other end of the resistor connected to the non-inverting input of the comparator U1. Also, a resistor R7 is connected to the non-inverting input of the comparator U1 and the other end of the resistor is connected to ground. The connecting of the resistors R11, R12, and R7 to the non-inverting input of the comparator U1 results in a voltage divider 115 of the BUSY signal 112 and the SELECT signal 114.

To complete the logic AND gate configuration of the comparator U1, a +0.77 volt reference 116 is applied to the inverting input of the comparator. The +0.77 volt reference 116 is provided by connecting resisters R9, R5, R6, and R1 in series, respectively, with the end of the resistor R1 connected to ground and the end of the resistor R9 connected to a +2.85 voltage source 118. Resisters R5, R6, and R1 are chosen to be of equal value and resistor R9 is chosen in order for the +0.77 volt reference 116 to be provided at the junction of resisters R6 and R1. It is preferred that the +2.85 voltage source 118 only vary between +/–5 millivolts to +/–15 millivolts and be provided by a voltage regulator U6. The voltage regulator U6 operates by converting a termination power supply voltage TERMPOWER (TP) 124, supplied by the SCSI bus, via connector J1. The TP 124 voltage supplied by the SCSI bus is typically at +5.0 volts but varies in the range of +4.25 volts to +5.25 volts in accordance with ANSI specification X3T9.2/86-109REV10c. In order to stabilize the TP 124 voltage, one end of a capacitor C1 is connected to TP 124 with the other end of the capacitor is connected to ground. Likewise, in order to stabilized the +2.85 voltage source 118 output of the voltage regulator U6, one end of capacitors C2 and C3 are connected to the +2.85 voltage source 118 and the other end of the capacitors are connected to ground.

A pull-up resistor R10 is connected to the +2.85 voltage source 118 and the other end of the resistor connects to the output of the comparator U1. The pull-up resistor R10 pulls the output of the comparator U1 to a high level when the comparator output is in an "open" state.

Also connected to the output of the comparator U1 is the base of an NPN transistor switch Q1. The collector of the transistor switch Q1 is connected, via connector J1, to a bus transmission line DBP0 119 which is part of the SCSI bus and is preferably that of the parity transmission line. Correspondingly, the bus transmission line DBP0 119 connects to one end of all terminators attached to the SCSI bus. Likewise, the opposite end of all terminators attached to the SCSI bus are connected to a +2.85 reference voltage similar to that provided by U6. The total resistance of all terminators connected between the bus transmission line DBP0 and the +2.85 reference voltage sources is referred to as the terminator resistance Rt (Rt not shown).

The emitter of the transistor switch Q1 is connected to a sensing resistor R2 which has its other end connected to ground. Furthermore, the emitter of the transistor switch Q1 also attaches to one end of a resistor R8 and the opposite end of the resistor is connected to the non-inverting input of an amplifier U2.

The amplifier U2 is configured as a non-inverting amplifier having a gain such that the voltage across sensing resistor R2 causes 3.0 volts at the output of the amplifier when the terminator resistance Rt equals that of three (3) terminators connected to the SCSI bus. To set the gain of the amplifier U2, a resistor R3 is connected to ground with its other end connected to the inverting input of the amplifier U2. Likewise, one end of a feedback resistor R4 is connected to the inverting input of the amplifier U2 and the other end of the feedback resistor is connected to the output of the amplifier.

The output of the amplifier U2 is connected to the inverting inputs of comparators U3, U4, and U5. The non-inverting input of U5 is connected to the +0.77 voltage reference 116. Likewise, the non-inverting input of U4 is connected a +1.54 voltage reference 120 provided at the junction of resisters R5 and R6. Furthermore, the non-inverting input of U3 is connected to a +2.31 voltage reference 122 provided at the junction of resisters R9 and R5.

To provide the +1.54 voltage reference 120 and the +2.31 voltage reference 122, the resisters R5, R6, and R1 are chosen to be of equal value and resistor R9, as described previously, was chosen so that the voltage at the junction of resistors R6 and R1 is approximately +0.77 volts. This resistor combination will cause the voltage at the junction of R5 and R6 to essentially be two times +0.77 volts and the voltage at the junction of R9 and R5 to essentially be three times +0.77 volts. These voltage levels are preferred in order that the inactive state termination tester apparatus effectively detects the various terminator types defined by the SCSI-2 specification.

The output 126 of comparator U3 is connected to the cathode of a light emitting diode (LED) D4. The anode of LED D4 is connected to one end of a resistor R14 and the other end of the resistor is connected to TP 124. Likewise, the output 128 of comparator U4 is connected to the cathode of a LED D3. The anode of LED D3 is connected to one end of a resistor R15 and the other end of the resistor is connected to TP 124. Finally, the output 130 of comparator U5 is connected to the cathode of a LED D2. The anode of LED D2 is connected to one end of a resistor R16 and the other end of the resistor is connected to TP 124.

Similarly, one end of a resistor R17 is also connected to TP 124 with the other end of the resistor connected to the anode of a LED D1. The cathode of the LED D1 is connected to ground.

Furthermore, the output 126 of comparator U3 is connected to one of the inputs of a two-input exclusive NOR gate U7. Likewise, the output 128 of comparator U4 is connected to both the other input of the exclusive NOR gate U7 and the D input of a flip-flop U8. The output 132 of exclusive NOR gate U7 is connected to the clock input of flip-flop U8.

The input to clear the flip-flop U8 is connected to TP 124. In addition, the input to preset the flip-flop U8 is connected to one end of a capacitor C4 and a resistor R13. The other end of capacitor C4 is connected to ground and the other end of resistor R13 is connected to TP 124.

The inverted Q output 134 of flip-flop U8 is connected to the enable input of three controllable bus terminators U9, U10, and U11. Each of the termination inputs of the controllable terminators U9, U10, and U11 is connected, via connector J1, to one of the bus transmission lines. Furthermore, depending on the state of the enable input to the controllable terminators U9, U10, and U11, the terminators will either actively be asserted in terminating the bus or effectively be removed from terminating the bus.

In the embodiment shown in FIG. 2, the comparators U1, U3, U4, and U5 are all part of a single integrated chip which has a voltage input pin 3 which is connected to TP 124. Similarly, voltage input pin 4 of the amplifier U2 is connected to TP 124.

The operation of the inactive state termination tester for use with a SCSI bus will now be explained with reference to FIG. 2. In particular, it must be recognized that a SCSI system communicates using a well defined protocol. One of the elements of the protocol is a means of determining if the bus is active or inactive. The SCSI bus is known to be inactive when the BUSY signal line and the SELECT signal line are simultaneously at a high logic level.

When the BUSY signal 112 is inactive (i.e., at a high logic level of greater than +2.5 volts), and the SELECT signal 114 is inactive (i.e., also at a high logic level of greater than +2.5 volts), the voltage formed at the non-inverting input of comparator U1 will be greater than the +0.77 voltage reference 116 connected to the inverting input of the comparator. This will result in the output of the comparator U1 to be pulled to a high logic level, thereby indicating the logical AND condition of the BUSY signal 112 and the SELECT signal 114. It may be shown that other combinations of the BUSY and the SELECT logic voltage levels will produce a voltage at the non-inverting input of comparator U1 which is less than the inverting reference voltage of 0.77 volts. In these cases the output of comparator U1 will go to a low logic level, thereby indicating the absence of the logical AND condition of the BUSY and the SELECT signal lines.

The diagnostic phase begins when the terminator resistance Rt is connected to sensing resistor R5 through the transistor switch Q1.

The base of the transistor switch Q 1 is controlled by the output of comparator U1. When the logical AND condition of the BUSY signal 112 and the SELECT signal 114 is met, the transistor switch Q1 is rendered conductive, thereby connecting the terminator resistance Rt associated with bus transmission line DBP0, through the transistor switch Q1, to the sensing resistor R2. The voltage at the junction of the terminator resistance Rt and sensing resistor 112 will be dependent upon the number of terminators present in the system. Correspondingly, the output voltage of amplifier U2 will be an indication of the number of terminators connected to the bus.

Since the terminators are connected to the bus in parallel, as the number of terminators present on the bus increase, the equivalent terminator resistance Rt will decrease. Thus, both the voltage at the sensing resistor R2 and the output voltage of amplifier U2 will increase as the number of terminators present on the bus increase.

Correspondingly, the output voltage of the amplifier U2 will exceed the voltage applied to the non-inverting input of the comparator U5 when one terminator is connected to the bus. Likewise, the output voltage of the amplifier U2 will exceed the voltage applied to the non-inverting input of both comparator U4 and comparator U5 when two terminators are connected to the bus. Finally, the output voltage of the amplifier U2 will exceed the non-inverting input of comparators U3, U4, and U5 when three or more terminators are connected to the bus.

When the voltage applied to the inverting input of comparator U3, U4, and/or U5 exceeds the voltage applied to the non-inverting input of a comparator, the output of the comparator will go to a low logic level. When the comparator's output is at the low logic level, current will flow through the LED, causing it to light, thereby indicating the number of terminators present in the system.

LED D2 will illuminate when one terminator is attached to the bus. Likewise, LED D2 and LED D3 will illuminate when two terminators are connected to the bus. Furthermore, LED D2, LED D3, and LED D4 will illuminate when three or more terminators are detected.

As a way of ensuring that power is applied to the inactive state termination tester 110, LED D1 will illuminate when the TP 124 voltage is applied to the termination tester.

Besides indicating the number of terminators attached to the bus, the terminator tester 110 is equipped with a means for providing a signal for enabling and disabling the controllable bus terminators U9, U10, and U11 from the bus. When the termination tester is connected to the bus, the TP 124 supply voltage from the bus will immediately be applied to the clear input of flip-flop U8. Conversely, the RC circuit formed by R13 and C4 will cause the voltage across C4 to ramp up. Therefore, the preset of the flip-flop U8 will initially be at a low logic level and will climb to a high logic level. The ramping of the preset of the flip-flop U8 will result in the inverted Q output 134 of flip-flop U8 being set to a low logic level. Correspondingly, the low logic level of the inverted Q output will cause the controllable terminators U9, U10, and U11 to become enabled to terminate the bus.

Furthermore, as stated previously, the output 126 of comparator U3 will go to a low logic level whenever three or more terminators are being detected on the bus. Conversely, when less than three terminators are being detected on the bus, or the bus is active and thus testing is temporarily suspended, the output 126 of comparator U3 will be at a high logic level.

As also stated previously, the output 128 of comparator U4 will go to a low logic level whenever two or more terminators are being detected on the bus. Conversely, when less than two terminators are being detected on the bus, or the bus is active and thus testing is temporarily suspended, the output 128 of comparator U3 will be at a high logic level.

Since both outputs 126 and 128 from comparators U3 and U4 are tied to the inputs of the exclusive NOR gate U7, the exclusive NOR gate output 132 will transition from a low to a high logic level whenever the comparators' outputs 126 and 128 transition from being at opposite logic levels to being at the same logic levels. For example, when the output 128 of comparator U4 is at a low logic level (i.e., two or more terminators are detected) and the output 126 of comparator U3 switches from a high logic level (i.e., less than three terminators are detected) to a low logic level (i.e., three or more terminators are detected), the output 132 of the exclusive NOR gate will switch from a low logic level to a high logic level. Therefore, it follows that the output 132 of exclusive NOR gate U7 will transition from a low to a high logic level whenever two terminators are connected to the bus and then either: 1) a third terminator is subsequently attached to the bus; or 2) one of the two terminators is subsequently removed from the bus; or 3) the bus resumes activity and thus the termination tester ceases in detecting the number of terminators connected to the bus.

During the three previously mentioned transition states of the output 132 of exclusive NOR gate U7, the inverted Q output 134 of flip-flop U8 will achieve the logic level corresponding to the opposite of that of the output 128 of comparator U4. Therefore, when two terminators are connected to the bus and then a third terminator is subsequently attached to the bus, the inverted Q output 134 of flip-flop U8 will be set to a high logic level when the output 132 of the exclusive NOR gate U7 transitions from a low to a high logic level. Likewise, when two terminators are connected to the bus and then one of the terminators is subsequently removed, the inverted Q output 134 of flip-flop U8 will be set to a low logic level when the output 132 of the exclusive NOR gate U7 transitions from a low to a high logic level. Finally, when two terminators are connected to the bus an the bus resumes activity, the output 134 of flip-flop U8 will be set to a low logic level when the output 132 of the exclusive NOR gate U7 transitions from a low to a high logic level.

Based on the above three transition states of the output 132 of the exclusive NOR gate U7, the inverted Q output 134 will only switch to a high logic level when three or more terminators are detected on the bus. Therefore, it follows that the controllable terminators U9, U10, and U11 will only be turned off when three or more terminators are determined to be connected to the bus since the controllable terminators are initially enabled when the termination tester 110 is connected to the bus. Otherwise, the controllable terminators will remain active in order to provide proper bus termination.

For completeness in the disclosure of the above-described inactive state termination tester apparatus, when it is used in conjunction with a SCSI bus, but not for purpose of limitation, the following representative values and component identifications are submitted. These values and components were employed in an inactive state termination tester apparatus that was constructed and tested and which provides a high quality performance. Those skilled in the art will recognized that many alternative elements and values may be employed in constructing the circuity in accordance with the present invention.

| Part | TYPE or VALUE |
| --- | --- |
| R1 | 1K Ohms |
| R2 | 10 Ohms |
| R3 | 1K Ohms |
| R4 | Select |
| R5 | 1K Ohms |
| R6 | 1K Ohms |
| R7 | 1K Ohms |
| R8 | 1K Ohms |
| R9 | 680 Ohms |
| R10 | 470 Ohms |
| R11 | 3.9K Ohms |
| R12 | 3.9K Ohms |
| R13 | 100K Ohms |
| R14–17 | 225 Ohms |
| C1 | 4.7 uF |
| C2 | 22 uF |
| C3 | .1 uF |
| C4 | .1 uF |
| D1–D4 | HLMP1585 |
| Q1 | 2N2222 |
| U1 | LM339D |
| U2 | LM324D |
| U3–U5 | LM339D |
| U6 | LT1117 |
| U7 | 74LS266 |
| U8 | 74LS74 |
| U9–U11 | UC5603 |
| J1 | SCSI68 |

As previously stated above, the value of the feedback resistor R4 is selected in order for 3.0 volts to be present at the output of the amplifier U2 when the terminator resistance Rt equals that of three (3) terminators connected to the SCSI bus. The feedback resistor R4 is selected because it is an easy way to compensate for the error tolerances of the other components used in the manufacture of the inactive state termination tester. In the embodiment depicted in FIG. 2, R4 is selected to be 4.0K.

It should be understood that various changes and modifications to the presently preferred embodiments described herein will be apparent to those skilled in the art. Such changes and modifications may be made without departing from the spirit and scope of the present invention and without diminishing its attendant advantages. For example, with minor variations, an inactive state termination tester can be used in conjunction with a VMEbus or any other various data transmission line configurations. Likewise, the inactive state termination tester can be used by omitting the display portion and just utilizing the terminator enable and disable portion of the circuitry. Therefore, it is intended that such changes and modifications be covered by the appended claims.

We claim:

1. An inactive state termination tester for determining the number of terminators connected to a bus, said inactive state termination tester comprising:

a) means for detecting bus inactivity to produce a bus inactivity signal;

b) means for detecting said number of terminators connected to said bus, when said bus inactivity signal is received, to produce a terminator detection signal corresponding to said number of terminators connected to said bus; and c) means for providing a signal for terminator enablement or disablement, respectively, depending on if there are not enough or too many terminators detected on said bus.

2. The inactive state termination tester of claim 1, which further comprises means for providing a display corresponding to said terminator detection signal to indicate said number of terminators connected to said bus.

3. The inactive state termination tester of claim 1, further comprising a controllable bus terminator which is enabled or disabled, respectively, depending on if there are not enough or too many terminators detected on said bus.

4. The inactive state termination tester of claim 1, which further comprises means for determining if power is applied to said inactive state termination tester.

5. An inactive state termination tester for determining the number of terminators connected to a SCSI bus, said inactive state termination tester comprising:

a) means for detecting when the SCSI bus is inactive to produce a SCSI bus inactivity signal;

b) means for determining the number of terminators connected to said SCSI bus, when said SCSI bus inactivity signal is received, to produce a terminator detection signal corresponding to said number of terminators connected to said SCSI bus; and c) means for providing a signal for SCSI bus terminator enablement or disablement, respectively, depending on if there are not enough or too many terminators detected on said SCSI bus.

6. The inactive state termination tester of claim 5, wherein said SCSI bus inactivity detection means comprises a voltage divider connected to the BUSY signal and the SELECT signal of said SCSI bus to provide a voltage divider output to indicate that said SCSI bus is inactive.

7. The inactive state termination tester of claim 6, wherein said SCSI bus inactivity detection means further comprises means for comparing said voltage divider output to a voltage reference to provide said SCSI bus inactivity signal when said voltage divider output is greater than said voltage reference.

8. The inactive state termination tester of claim 5, wherein said means for determining the number of terminators comprises:

a) means for sensing the number of terminators connected to said SCSI bus to provide a sense output corresponding to said number of terminators connected to said SCSI bus; and b) means for connecting said sensing means to said SCSI bus when said SCSI bus inactivity signal is received.

9. The inactive state termination tester of claim 8, Wherein said means for determining the number of terminators further comprises means for amplifying said sense output corresponding to said number of terminators detected on said SCSI bus to provide said terminator detection signal.

10. The inactive state termination tester of claim 5, which further comprises means for providing a display corresponding to said terminator detection signal.

11. The inactive state termination tester of claim 10, wherein said means for providing a display comprises means for visually displaying when less than one terminator is indicated by said terminator detection signal as being connected to said SCSI bus.

12. The inactive state termination tester of claim 10, wherein said means of providing a display comprises means for visually displaying when more than two terminators are indicated by said terminator detection signal as being connected to said SCSI bus.

13. The inactive state termination tester of claim 10, wherein said means of providing a display comprises means for visually displaying when two terminators are indicated by said terminator detection signal as being connected to said SCSI bus.

14. The inactive state termination tester of claim 10, wherein said means of providing a display comprises means for displaying when one, two, or three or more terminators are indicated by said terminator detection signal as being connected to said SCSI bus.

15. The inactive state termination tester of claim 5, wherein said inactive state termination tester further includes:

a) means for comparing said terminator detection signal to a reference voltage to provide a display signal indicating said number of terminators connected to said SCSI bus; and b) means for illuminating an LED corresponding to said display signal indicating said number of terminators connected to said SCSI bus.

16. The inactive state termination tester of claim 5, wherein said signal providing means comprises:

a) means for comparing said termination detection signal to a reference voltage to provide at least one signal corresponding to said number of terminators connected to said SCSI bus;

b) means for determining if terminators should be enabled or disabled from said SCSI bus; and c) means for latching said enabling or disabling signal corresponding to if said SCSI bus terminators should be enabled or disabled from said bus.

17. The inactive state termination tester of claim 5, further comprising a SCSI controllable bus terminator which is enabled or disabled, respectively, depending on if there are not enough or too many terminators determined to be connected to said SCSI bus.

18. The inactive state termination tester of claim 5, which further comprises means for determining if power is applied to said inactive state termination tester.

19. A method for determining the number of terminators connected to a bus, said method comprising the steps of:

a) detecting bus inactivity;

b) determining the number of terminators connected to said bus during bus inactivity; and c) providing a signal for controllable bus terminator enablement or disablement, respectively, depending on if there are not enough or too many terminators determined to be connected to said bus.

20. The method of claim 19, which further includes displaying said number of terminators connected to said bus.

21. The method of claim 19, which further includes enabling or disabling, respectively, a controllable bus terminator depending on if there are not enough or too many terminators determined to be connected to said bus.

* * * * *